United States Patent
Mayer et al.

(10) Patent No.: US 10,906,110 B2
(45) Date of Patent: Feb. 2, 2021

(54) POWER TOOL WITH INTEGRATED MEASUREMENT DEVICE AND ASSOCIATED METHODS

(71) Applicant: TRANSFORM SR BRANDS LLC, Hoffman Estates, IL (US)

(72) Inventors: Cody Lyle Mayer, Chicago, IL (US); Brian Todd Reese, St. Charles, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 380 days.

(21) Appl. No.: 15/581,843

(22) Filed: Apr. 28, 2017

(65) Prior Publication Data
US 2018/0311751 A1 Nov. 1, 2018

(51) Int. Cl.
| | |
|---|---|
| *B23D 59/00* | (2006.01) |
| *B23D 45/04* | (2006.01) |
| *G01B 3/12* | (2006.01) |
| *B23D 47/04* | (2006.01) |

(52) U.S. Cl.
CPC .......... *B23D 59/001* (2013.01); *B23D 45/044* (2013.01); *B23D 47/04* (2013.01); *B23D 59/008* (2013.01); *G01B 3/12* (2013.01)

(58) Field of Classification Search
CPC .... B23D 59/00; B23D 59/001; B23D 59/002; B23D 59/003; B23D 59/008
See application file for complete search history.

(56) References Cited

U.S. PATENT DOCUMENTS

| | | | | |
|---|---|---|---|---|
| 3,868,877 A | * | 3/1975 | Shoji | G03D 15/046 83/210 |
| 4,572,046 A | * | 2/1986 | Still | B29D 30/46 83/171 |
| 4,685,318 A | * | 8/1987 | Ueda | B21D 13/04 72/185 |
| 4,866,630 A | * | 9/1989 | Beaman | B23D 53/04 700/160 |
| 4,908,953 A | | 3/1990 | Wallisser | |
| 5,205,049 A | | 4/1993 | Rieder et al. | |
| 5,327,653 A | * | 7/1994 | Pistorius | B23D 47/04 33/1 M |

(Continued)

OTHER PUBLICATIONS

International Search Report and Written Opinion for PCT/US2018/027044, dated Aug. 23, 2018, 11 pages.

(Continued)

*Primary Examiner* — Andrea L Wellington
*Assistant Examiner* — Richard D Crosby, Jr.
(74) *Attorney, Agent, or Firm* — McAndrews, Held & Malloy, Ltd.

(57) ABSTRACT

Various embodiments of tools with integrated measurement devices are described. An apparatus may include a tool to be applied to a workpiece, an integrated measurement device in a feed path of the tool, and a controller. The integrated measurement device may generate signals indicative of rotation of a roller in a feed path of a workpiece. The controller may generate, based on the signal, a distance measurement of the workpiece. The distance measurement may indicate a distance between an end of the workpiece and a location of the workpiece to which the tool is to be applied.

18 Claims, 7 Drawing Sheets

(56) References Cited

U.S. PATENT DOCUMENTS

| | | | | |
|---|---|---|---|---|
| 5,418,729 A | * | 5/1995 | Holmes | B23D 59/008 700/167 |
| 5,636,558 A | * | 6/1997 | Sanders | B24C 1/045 83/53 |
| 5,735,324 A | * | 4/1998 | Ponce | B23D 59/001 144/216 |
| 5,970,830 A | * | 10/1999 | von Niederhausern | B23B 13/02 414/14 |
| 6,601,494 B1 | * | 8/2003 | Jourdan | B23D 53/023 83/798 |
| 6,772,665 B1 | * | 8/2004 | Hurdle, Jr. | B23D 59/002 144/356 |
| 7,580,804 B2 | | 8/2009 | Wixey | |
| 8,783,140 B2 | * | 7/2014 | Dick | B23D 45/14 83/13 |
| 10,466,675 B2 | * | 11/2019 | Gibson | B23D 47/04 |
| 2001/0000856 A1 | * | 5/2001 | O'Banion | B23D 45/044 83/76.9 |
| 2003/0145906 A1 | * | 8/2003 | Tekulve | B27B 29/00 144/378 |
| 2003/0197138 A1 | | 10/2003 | Pease et al. | |
| 2004/0215414 A1 | | 10/2004 | Kaisser | |
| 2005/0076760 A1 | * | 4/2005 | Takano | B23D 45/044 83/581 |
| 2005/0262983 A1 | * | 12/2005 | Hetcher | B23D 45/044 83/471.3 |
| 2006/0101960 A1 | | 5/2006 | Smith et al. | |
| 2007/0157782 A1 | * | 7/2007 | Hetcher | B23D 45/048 83/471.3 |
| 2007/0205665 A1 | * | 9/2007 | Kawano | B23D 45/044 307/31 |
| 2010/0037739 A1 | | 2/2010 | Anderson et al. | |
| 2010/0064869 A1 | * | 3/2010 | Poole | B27B 27/04 83/72 |
| 2010/0071521 A1 | * | 3/2010 | Hadaway | B23D 45/06 83/76.1 |
| 2010/0107842 A1 | * | 5/2010 | Kelsey | B23D 59/002 83/522.15 |
| 2010/0152882 A1 | | 6/2010 | Krapf et al. | |
| 2011/0048202 A1 | * | 3/2011 | Peterson | B23D 45/044 83/471.2 |
| 2011/0226105 A1 | | 9/2011 | Butler et al. | |
| 2012/0011978 A1 | * | 1/2012 | Liu | B23D 45/048 83/471.2 |
| 2014/0130643 A1 | | 5/2014 | Dammertz et al. | |
| 2014/0318342 A1 | | 10/2014 | Koegel et al. | |
| 2015/0246399 A1 | | 9/2015 | Knight et al. | |
| 2016/0136742 A1 | * | 5/2016 | Knight | B23Q 17/20 33/640 |
| 2017/0167855 A1 | * | 6/2017 | Reese | G01B 11/14 |
| 2018/0311751 A1 | * | 11/2018 | Mayer | B23D 59/001 |

OTHER PUBLICATIONS

"The Optical Mouse as a Two-Dimensional Displacement Sensor", Science Direct, Jun. 2003, 5 pages.

* cited by examiner

POWER TOOL WITH INTEGRATED MEASUREMENT DEVICE AND ASSOCIATED METHODS

FIELD OF THE INVENTION

Various embodiments relate to measuring a workpiece, and more particularly, to power tools with measurement devices.

BACKGROUND OF THE INVENTION

When power tools are used, a workpiece is typically measured and appropriately marked at a desired location. The operator of the power tool may reference the applied mark when determining where to apply the power tool to the workpiece. The process is often cumbersome requiring the operator to hold the workpiece, manipulate a measurement device with respect to the workpiece, and mark the workpiece at a desired location. To make matters worse, common practice is to measure at least twice before applying a power tool to the desired location to ensure that the measuring and marking process was completed accurately. While such measuring techniques reduce the likelihood of error, such measuring techniques also increase the time needed to perform the operation. Such measuring techniques also cause the user to endure the cumbersome practice at least twice for each measurement. Thus, many people find current measuring techniques to be time consuming, error prone, and cumbersome.

Limitations and disadvantages of conventional and traditional approaches should become apparent to one of skill in the art, through comparison of such systems with aspects of the embodiments set forth in the remainder of the present application.

BRIEF SUMMARY OF THE INVENTION

Measurement techniques and apparatus incorporating such measurement techniques are substantially shown in and/or described in connection with at least one of the figures, and are set forth more completely in the claims.

Advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

DETAILED DESCRIPTION OF THE INVENTION

Aspects of the present invention are generally related to measurement devices and more specifically to power tools comprising measurement devices. The following description focuses upon an embodiment of a power tool in the form of a miter saw having a blade for cutting a workpiece. However, various aspects of the disclosed measurement devices may be applicable to a wide range of power tools such as circular saws, table saws, scroll saws, jigsaws, drill presses, routers, router tables, planers, shapers, etc., that include a blade, drill bit, or other tool applied to a workpiece.

As explained in greater detail below, the measurement device may eliminate the conventional measurement and marking process for some applications. For example, the measurement device may enable the operator to directly move the workpiece to a desired position relative to a tool (e.g., cutting blade, drill bit, etc.) to be applied to the workpiece. To this end, the measurement device may be positioned in the feed path of the tool (e.g., integrated into a deck, fence, housing, etc., of the tool) such that the measurement device may engage and measure the workpiece as it travels the feed path and traverses the measurement device. The traveled distance, relative to the applied tool, may be visually displayed via an integrated display of the power tool or a display remote from the power tool. After the operator determines, based on the displayed measurement, that the tool is positioned at a desired location of the workpiece, the operator may hold the workpiece in place and apply the tool to the workpiece at the desired location.

Figure 1:
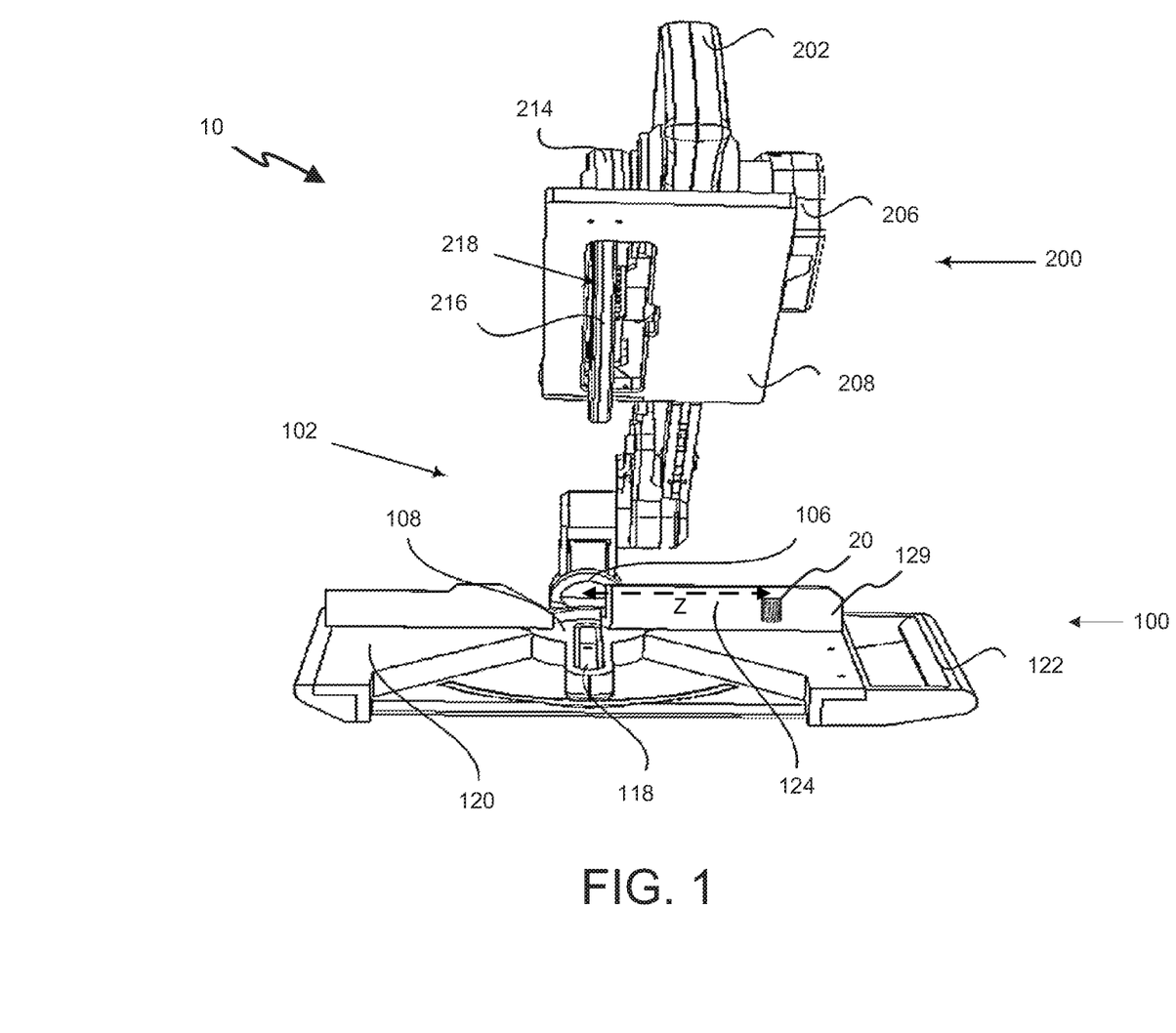
FIGS. 1-3 provide perspective views of a power tool in accordance with one embodiment.
Figure 2:
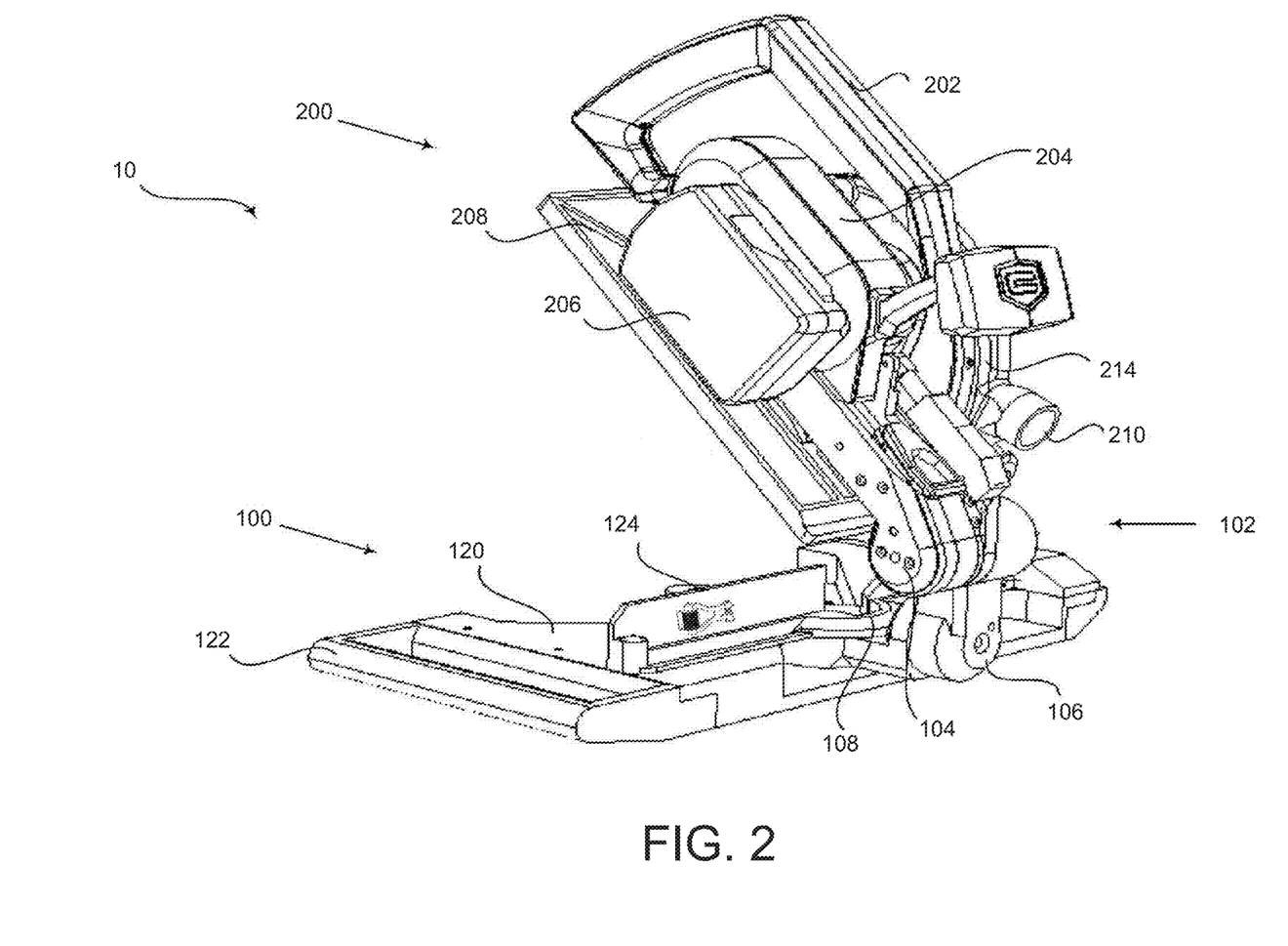
Figure 3:
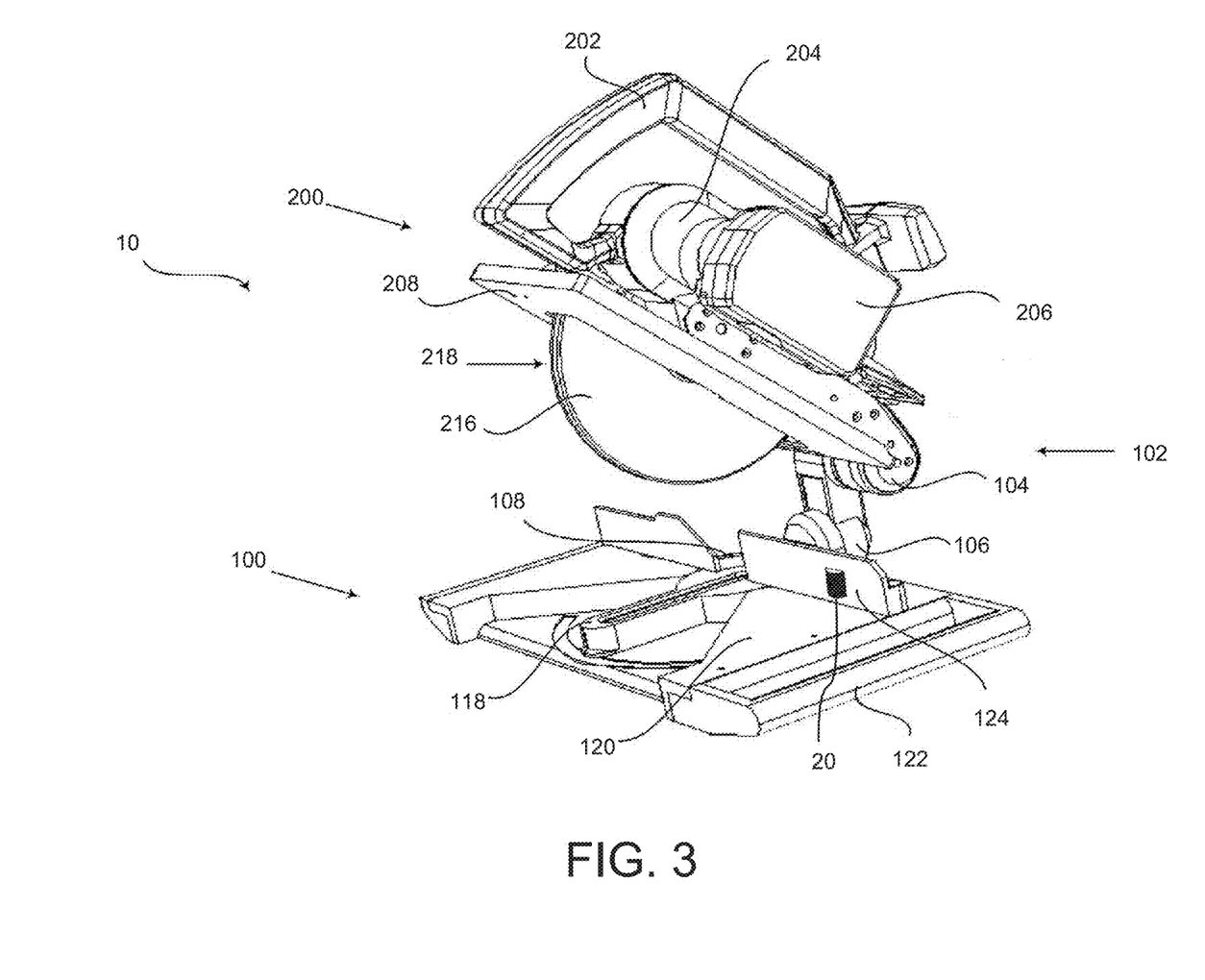
Figure 4:
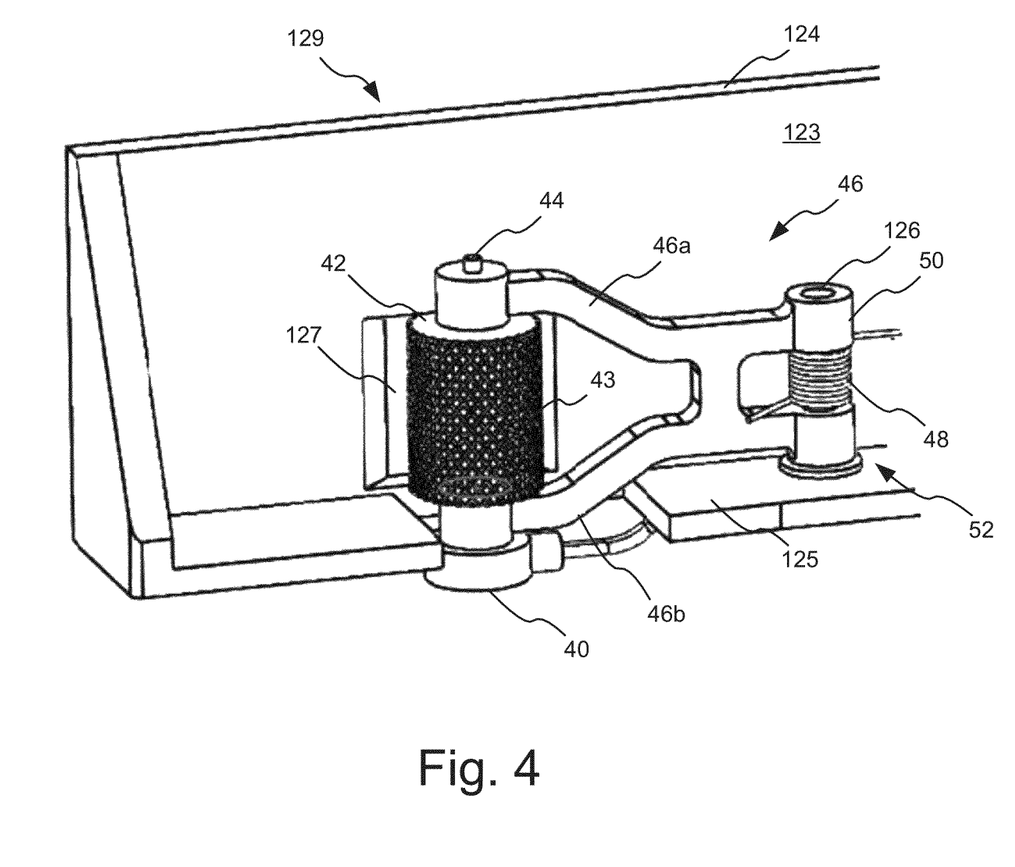
FIG. 4 provides a detailed perspective view of a measurement device of the power tool shown in FIGS. 1-3.
Figure 5:
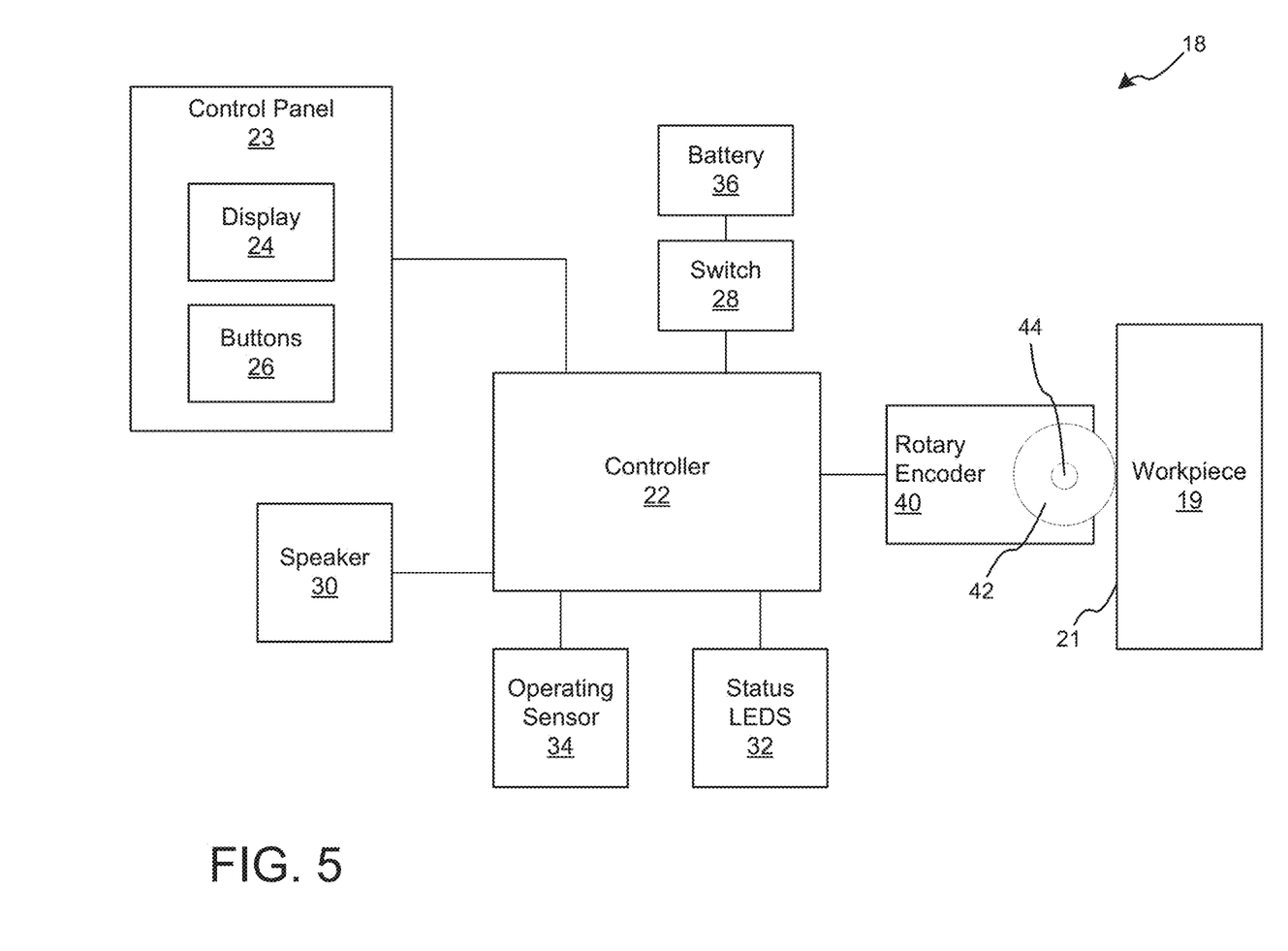
FIG. 5 provides a block diagram of a control system of the power tool shown in FIGS. 1-3.

One embodiment of a power tool comprising an integrated measurement device is shown in FIGS. 1-5. In particular, FIGS. 1-3 provide perspective views of the power tool in the form of a miter saw assembly 10 having a measurement device 20. FIG. 4 provides a perspective view of the measurement device 20. FIG. 5 provides a block diagram depicting a control system of the power tool and interaction of the power tool with a workpiece 19. As noted above, the measurement device 20 may be suitable for a wide range of different tools. In such embodiments, the measurement device 20 may be integrated into decks, fences, housings, bases, etc. of the other tools in a manner consistent with the appended claims.

As shown, the miter saw assembly 10 may include a circular saw 200 coupled to a miter base 100. The circular saw 200 may include a circular blade 218, a motor 204, and a power supply 206. The motor 204 may be operable to rotate the circular blade 218. The power supply 206 may be operable to provide power to the motor 204.

The miter base 100 may include a base 120 and a support arm 102. The support arm 102 may comprise a vertical pivot 104, a bevel pivot 106 (if the miter saw assembly 10 is a compound miter saw, for example), and a horizontal pivot 108. In some embodiments, such as if the miter saw assembly 10 is a sliding compound miter saw, the support arm 102 may comprise sliding rails (not shown) such that the circular saw 200 may be pushed towards the rear of the miter base 100 and/or pulled towards the front of the miter base 100 while in the cutting position. The vertical pivot 104 may permit the support arm 102 and attached circular saw 200 to pivot downward to a cutting position and upward from the cutting position. The bevel pivot 106 may permit the support arm 102 and attached circular saw 200 to tilt sideways to provide beveled cuts. The horizontal pivot 108 may permit the support arm 102 and attached circular saw 200 to rotate horizontally to provide angled cuts.

The base 120 may comprise a blade receiving miter table 118, a handle 122, and a fence 124. The handle 122 may be grasped to transport the miter saw assembly 10. The blade receiving miter table 118 may be operable to receive a cutting blade 218 of the circular saw 200 as the circular saw 200 vertically pivots downward to a cutting position. In some embodiments, such as if the miter saw assembly 10 is a sliding compound miter saw, the blade 218 of the circular saw 200 may be pushed within the blade receiving miter table 118 towards the rear of the miter base 100 and/or pulled within the blade receiving miter table 118 towards the front of the miter base 100 while in the cutting position. The blade receiving miter table 118 may be operable to rotate horizontally about the horizontal pivot 108 in unison with the support arm 102 when the circular saw 200 is rotated horizontally to change an angle of a cut.

The fence 124 may be operable to provide a precise cutting angle between the plane of the blade 218 and the plane of a workpiece edge when the workpiece 19 is held against the fence 124. The default angle of the fence 124 in relation to the blade 218 of the circular saw 200 may be ninety degrees. The angle of the fence 124 in relation to the blade 218 may be adjusted by, for example, horizontally rotating the circular saw 200 coupled to the coupling arm about the horizontal pivot 108.

The circular saw 200 may comprise a handle 202, a motor 204, a power supply 206, a foot 208, a dust port 210, a blade guard lever 212, a housing 214, a blade guard 216, and a blade 218. An operator may grasp the handle 202 to operate the circular saw 200 and maneuver the circular saw 200 as guided by the support arm 102. The handle 202 may include a grip, such as rubber, grooves, or any suitable material or texture. The handle 202 may include buttons, triggers, or the like for activating the circular saw 200. The motor 204 may be powered by the power supply 206 and may be operable to rotate the blade 218 when activated. The power supply 206 may be an alternating current (AC) power supply (e.g., through a cord from a plug that mates with a wall socket), a direct current (DC) power supply (e.g., a battery), or any suitable power supply.

The foot 208 may be operable to rest on a surface that is being cut. Particularly, the foot 208 may be generally parallel with the surface being cut when the circular saw 200 is pivoted downward into the cutting position. In some embodiments, the foot 208 may automatically adjust to remain generally parallel with the surface being cut as the circular saw 200 is tilted sideways by the bevel pivot 106. The foot 208 may be movable to adjust a depth of a cut. The dust port 210 may extend from the housing 214 and may be operable to discharge dust formed during a sawing operation. A dust bag (not shown) may be attached to the dust port 210 to collect the dust discharged through the dust port.

The blade 218 may comprise a circular blade that is rotated by the motor 204 to cut a workpiece 19. In certain embodiments, different blades 218 may be used for cutting different workpiece 19 materials, such as wood, plastic, metal, or any suitable material. The different blades 218 may comprise teeth of various sizes and configurations based on the application. The blade 218 may be metal, such as steel, titanium, or any suitable material. The blade 218 may be removable and replaceable with other circular blades. For example, a blade 218 may be removed and replaced if the workpiece material changes or if the blade is worn, among other things.

The miter saw assembly 10 may comprise a measurement device 20 that aids an operator in positioning a workpiece 19 such that the blade 218 cuts the workpiece 19 at a desired location. To this end, the miter saw assembly 10 may include a control system 18 as shown in FIG. 5. The control system 18 may include a controller 22 coupled to one or more measurement devices 20 that are positioned in the feed path of the miter saw assembly. In particular, the measurement devices 20 may be integrated, mounted, or otherwise associated with the fence 124 of the miter saw assembly 10. In particular, the measurement devices 20 may be positioned such that the measurement devices 20 physically engage a surface 21 of the workpiece 19 as the workpiece 19 traverses the fence 124. In other embodiments, the measurement devices 20 may be placed in the base 100 of the assembly 10 such that the measurement devices 20 physically engage a bottom surface of the workpiece 19 as the workpiece 19 traverses the base 100. The measurement devices 20 may be positioned on the fence 124 or base 100 on either side of the blade 218. Furthermore, the measurement devices 20 may be positioned in an array up the fence 124 or across the base 100. In other embodiments, the measurement devices 20 may be mounted in a manner that permits repositioning the measurement devices 20 in a manner suited for a particular workpiece 19.

A plurality of measurement devices 20 may provide redundancy to ensure accuracy of obtained measurements by measuring the workpiece 19 in multiple places, simultaneously or concurrently, and comparing obtained measurements to ensure proper continuity during the measurement process. Placement of the measurement devices 20 may also be based on preferences of the operator. For instance, an operator of the power tool may prefer to feed a workpiece 19 to the blade 218 from the left side or from the right side, in which case the measurement devices 20 may be positioned only on the preferred side of the blade 218.

The controller 22 may comprise a microcontroller comprising a microprocessor, memory, and input/output ports for interacting with various input/output (I/O) devices. In general, the microprocessor may execute instructions of a control program stored in memory in order to obtain measurements via signals received from measurement devices 20 and control operation of the miter saw assembly 10. Further example details of such control operations are presented below with respect to the flowcharts of FIGS. 6 and 7.

As shown, the controller 22 may be coupled to a measurement device 20 and a control panel or user interface 23 having a display 24 and one or more buttons 26. The controller 22 may be further coupled to a power switch 28, a speaker 30, status LEDs 32, and operating sensor 34. A battery 36 or other power source such as the power supply 206 may power the components of the control system 18 when the power switch 28 is in an on position. While FIG. 5 depicts the controller 22 coupled to various I/O devices, the controller 22 may be coupled to a wide array of additional or alternative I/O devices such as a touch panel, buttons, dials, switches, a digital read out displays, light emitting diode (LED) displays, liquid crystal displays (LCDs), LEDs, lamps, accelerometers, etc., in order to monitor operation of the miter saw assembly 10 and to appropriately interact with an operator of the miter saw assembly 10.

The display 24 may present one or more digits that are representative of distance measurements (e.g., 1", 5", 4.52", etc.) obtained via the measurement device 20. The speaker 30 may provide audible feedback such as messages or warnings in the form of audible tones or spoken words. The status LEDs 32 may present visual feedback as to the operating state of the miter saw assembly 10. For example, the status LEDs 32 may include an LED that is illuminated to indicate whether the measurement device 20 is powered and an LED that is illuminated to indicate whether an error occurred while generating a distance measurement of the workpiece 19.

In some embodiments, the controller 22 may present via the display 24 and/or status LEDs 32 a detected travel direction (e.g., left or right, toward or away, etc.) of the workpiece 19 with respect to the measurement devices 20. The controller 22 may further record and present the distance measurement of the workpiece 19 at the time the workpiece 19 was cut. The controller 22 may record the distance measurement in response to detecting the saw 200 cutting the workpiece 19. Such detecting may be based on directly sensing activation of the button, switch, etc., in the handle 202 of the saw 200. Such detecting may also be achieve indirectly by way of an operating sensor 34 such as an accelerometer or other sensor that is capable of sensing operation of the saw 200. The recorded and presented distance measurement may guide an operator of the saw 200 in cutting another workpiece 19 to the same length.

Each of the measurement devices 20 may include a rotary or shaft encoder 40. The rotary encoder 40 comprises an electro-mechanical device that converts the angular position or motion of a roller 42 about a shaft or axle 44 to an analog or digital code and generates an output signal providing the analog or digital code. In some embodiments, the rotary encoder 40 comprises an incremental rotary encoder or relative rotary encoder that generates an output signal indicative a relative motion of the shaft 44 and/or roller 42. In other embodiments, the rotary encoder 40 comprises an absolute rotary encoder that generates an output signal indicative of an absolute, current position of the shaft 44 and/or roller 42.

Referring now to FIG. 4, a perspective view of the measurement device 20 mounted to a back surface 123 of fence 124 is provided. As shown, the measurement device may include a rotary encoder 40, a roller 42, a shaft 44, a fork 46, and a spring 48. The roller 42 may be positioned between two blades 46a, 46b of the fork 46. The roller 42 may be further affixed to or integrated with a shaft 44 which extends along a longitudinal axis of the roller 42 and through the blades 46a, 46b. As a result, the shaft 44 may rotatably mount the roller 42 between the blades 46a, 46b of the fork 46 in a manner that permits the roller 42 to rotate about its longitudinal axis. Moreover, the shaft 44 may couple the roller 42 to the rotary encoder 40 such that the rotary encoder 40 may track rotation of the shaft 44 and/or roller 42.

The fork 46 may be coupled to a base 125 of the fence 124. In particular, a pin 126 in the base 125 may extend through a barrel 50 at a base 52 of the fork 46. The pin 126 may pivotably couple the fork 46 to the fence 124. Moreover, the spring 48 may bias the fork 46 toward the fence 124 such that a surface 43 of the roller 42 protrudes or extends through an opening 127 in the fence 124. The surface 43 of the roller 42 may be configured to engage with a workpiece 19 traveling along the front surface 129 of the fence 124. To this end, the surface 43 of the roller 42 may be coated or otherwise formed from a substance such as plastic, rubber, metal, etc., that engages the workpiece 19 in a manner the maintains sufficient frictional contact with the workpiece 19 to cause the roller 42 to rotate and closely track the travel of the workpiece 19 along the front surface 129 of the fence 124. In some embodiments, the surface 43 may be knurled, patterned, or otherwise textured to further aid the roller 42 in closely tracking the workpiece 19.

In some embodiments, the measurement device 20 is calibrated to account for an offset distance Z between the measurement device 20 and the blade 218. Moreover, the calibration may account for differences in cutting width or kerf of different blades 218. The calibration or zeroing process may be accomplished in a number of different manners.

Figure 6:
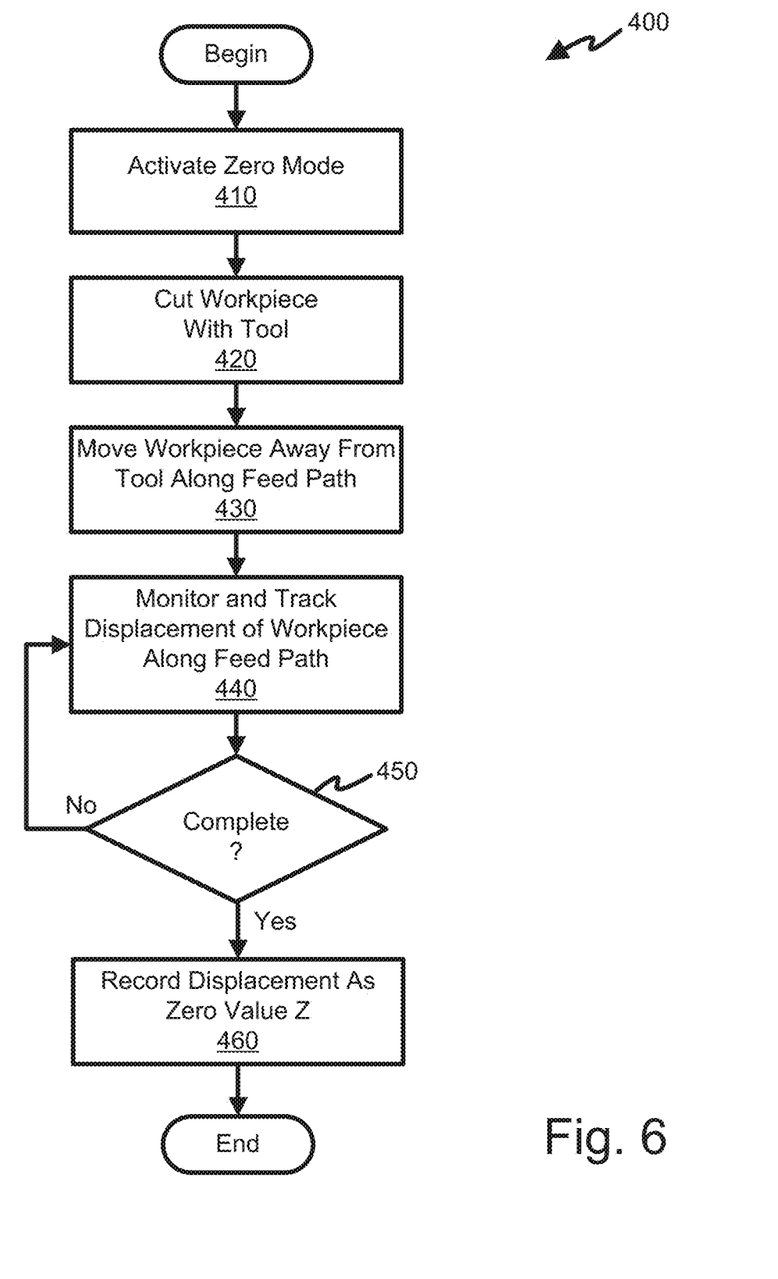
FIG. 6 provides a flowchart of an example zeroing process implemented by the control system of FIG. 5.

Referring now to FIG. 6, a flowchart of one embodiment of such a zeroing process 400 is shown. In general, the zeroing process 400 provides a measurement device 20 with the offset distance Z from the measurement device 20 to a far face of the saw blade 218 that faces away from the measurement device 20. Such distance accounts for the kerf of the blade 218 thus allowing calibration for different blades being used with the saw 200.

At 410, a zero mode of the miter assembly 100 is activated. For example, a user of the miter assembly 100 may activate the zero mode by pressing or pressing and holding one or more buttons 26 of the control panel 23. At 420, the blade 218 is applied to and cuts through a scrap workpiece 19, thus aligning the cut end of the workpiece 19 with the blade 218. At 430, the scrap workpiece 19 is fed in reverse, away from the blade 218 and across the measurement device 20. In response to feeding the scrap workpiece 19 across the measurement device 20, the rotary encoder 40 of the measurement device 20 at 440 may track displacement of the scrap workpiece 19 as it travels away from the blade 218.

At 450, the controller 22 may determine whether measurement of the scrap workpiece 19 is complete. For example, in one embodiment, a user may press one or more buttons 26 of the control panel 23, after the workpiece 19 clears the measurement device 20, to inform the controller 22 that measurement device 20 has completed its distance measurement of the scrap workpiece 19. If the controller 22 determines that the measurement device 20 is still measuring the scrap workpiece 19, the controller 22 may return to 440 to further monitor and track the displacement of the workpiece 19 along the feed path. However, if the distance measurement is complete, then the controller 22 may proceed to 460 to record the measured distance. In this manner, the miter assembly 100 may obtain the offset distance Z between the measurement device 20 and the near face of the blade 218. Furthermore, the measurement device 20 may utilize the offset distance Z as a zero value to adjust measurements of a workpiece 19 to account for the offset distance between the measurement device 20 and the blade 218.

One alternative to the zeroing process 400 is for the miter assembly 100 to come preset from the factory with a zero value Z corresponding to the distance from the measurement device 20 to the near side or far side of the blade 218. The user may then manually enter via the control panel 23 the width of the blade 218, a part number for the blade 218, or some other identifying information from which the measurement device 20 may ascertain the width of the blade 218.

For another alternative, the miter saw 200 may be configured such that the face of the saw blade mandrel is on the side opposite or distal from the measurement device 20. In such a configuration, the width of the blade 218 would not affect the location of the far side of the blade 218 but location of the near side of the blade 218 would vary based on the blade width.

Another approach for zeroing the measurement device 20 is based on the fact that the workpiece 19 is already zeroed after a cut. After the operator has made the a first cut on a particular workpiece 19, if the remaining work piece is not removed from flush contact with the fence 124 after the cut, the controller 22 may recognize that a cut has occurred and may re-zero off the end of the workpiece 19. The workpiece 19 may now be fed again.

In one embodiment, the fence 124 intersects a vertical pivot axis of the saw 200. As such, the distance from the measurement device 20 to the relevant face of the blade 218 does not change when the miter angle is adjusted. However, for embodiments in which the distance may change as a result of adjusting the angle of the cut, re-executing the zeroing process may be warranted to ensure proper measurement. To this end, the control system 18 may include further sensors that may detect a change in the miter angle. The control system 18 may then warn the operator via display 24 and/or status LEDs 34 that a performing a zeroing process may be warranted. In some embodiments, the system may include sensors via which the control system 18 may measure the rotate angle of the saw and calculate the new zero position based on the measured rotation. Such sensors may also permit the control system to display measurements along the short and/or long side of the board based on a known the width of the board.

Figure 7:
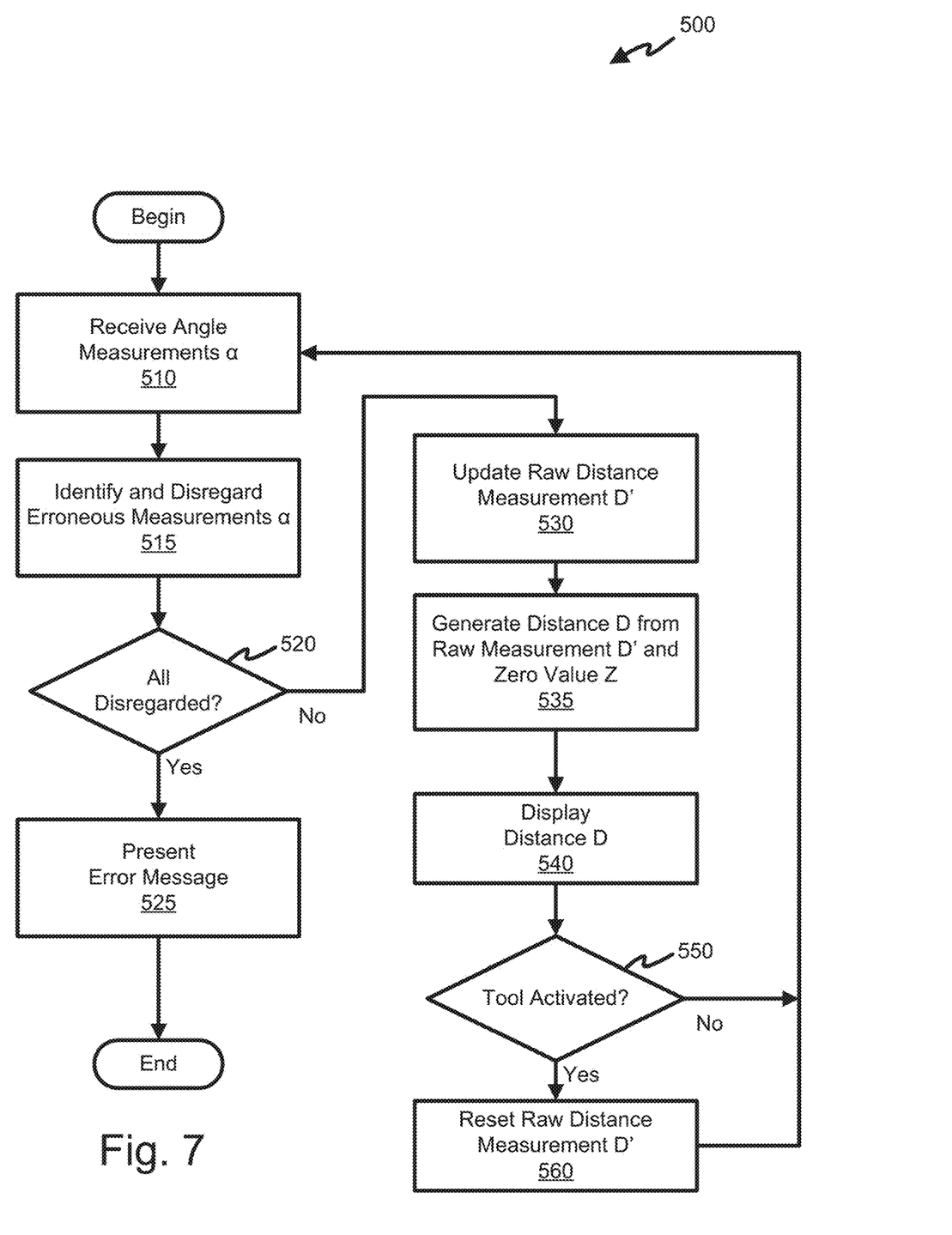
FIG. 7 provides a flowchart of an example operation of the control system of FIG. 5.

Referring now to FIG. 7, a flowchart depicting a control process implemented by the controller 22 of the miter assembly 10 is shown. At 510, the controller 22 may receive angle measurements α (e.g., angle increments or absolute angle positions) from the rotary encoders 40 of one or more measurement devices 20.

The controller 22 at 520 may identify and disregard angle measurements α that are likely erroneous. Multiple rotary encoders 40 may ensure accurate and consistent measurements by way of adding redundancy and permitting the controller 22 to compare multiple measurements. Multiple rotary encoders 40 may also ensure accurate measurements are obtained with various height/shape workpieces. For example, in a single rotary encoder embodiment, erroneous measurements may occur where the workpiece 19 is not wide or tall enough to engage the roller 42 of the rotary encoder 40. Also, since feeding the workpiece 19 in some embodiments is a manual process, the operator may pivot or "seesaw" the workpiece 19 in such a way that during the measurement phase, one or more rollers 42 of the rotary encoders 40 may lose contact with the workpiece 19 and generate erroneous measurements. Multiple rotary encoders 40 may also address workpiece irregularities, such as wood knots, defects, dust, etc. that may impede a single rotary encoder 40 from accurately obtaining measurements.

The controller 22 at 515 may utilize various techniques to identify erroneous angle measurements α. For example, the controller 22 may determine that an angle measurement α is erroneous if it is not within a certain percentage or range of prior angle measurements α received from other rotary encoders 40. Further, the controller 22 may determine an angle measurement α from a rotary encoder 40 is erroneous if not within a certain percentage or range of the prior angle measurements α received from the same rotary encoder 40.

At 520, the controller 22 may determine whether all angle measurements α have been disregarded. If all have been disregarded, the controller 22 at 525 may cause the display 24, the speaker 30, and/or one or more of the status LEDs 32 to present an error message or warning to the operator of the miter saw assembly. However, if the controller 22 determines that all have not been disregarded, then the controller 22 at 530 may update a raw distance measurement D'. To this end, the controller 22 may update an angle total $\alpha_T$ based on the obtained angle measurements α. In one embodiment, the controller 22 may average the retained angle measurements α to obtain an average angle measurement $\overline{\alpha}$ and add the average angle measurement $\overline{\alpha}$ to the angle total ar. The controller 22 may then calculate the raw distance measurement D' of the workpiece 19, wherein the raw distance measurement D' corresponds to a distance the workpiece 19 has traveled along the measurement device 20. To this end, the controller 22 may calculate the raw distance measurement D' of the workpiece 19 based on Equation (1).

$$D' = (\alpha_T \cdot r) \quad \text{Equation (1):}$$

where:
$\alpha_T$ is the total of the average angle measurements $\overline{\alpha}$; and
r is the radius of the roller 42.

The controller 22 at 535 may then adjust the raw distance measurement D' to account for the distance between the measurement device 20 and the relevant face of the blade 218. To this end, the controller 22 may determine the direction of travel (e.g., left-to-right feed, or right-to-left feed) of the workpiece 19 based on the received angle measurements α. For example, the measurement device 20 may be positioned to the right of the blade 218. In such an embodiment, if the workpiece 19 is fed to the blade 218 right-to-left, then the workpiece 19 passes the measurement device 20 prior to reaching the blade 218. As such, the controller 22 may determine that the far face of the blade 218 is the relevant face for measurement purposes. The controller 22 may therefore obtain a distance measurement D of the workpiece 19 by subtracting from the raw distance measurement D' the zero value Z as well as adding a value K that corresponds to the kerf or width of the blade 218. In this manner, the controller 22 may obtain a distance measurement D, which corresponds to the distance from the measurement device 20 to the far face of the blade 218. Conversely, if the workpiece 19 is fed to the blade 218 left-to-right, then the workpiece 19 passes the blade 218 before reaching the measurement device 40. As such, the controller 22 may determine that the near face of the blade 218 is the relevant face for measurement purposes. The controller 22 may therefore obtain the distance measurement D of the workpiece 19 by subtracting from the raw distance measurement D' the zero value Z.

The controller 22 at 540 may update the display 24 to present the obtained distance measurement D. The controller 22 at 550 may determine whether the power tool has been activated. As noted above, the controller 22 may make such determination based upon whether a trigger or button in the handle 202 of the saw 200 is actuated. In other embodiments, the controller 22 may make such determination based on signals received from the operating sensor 34. If the power tool has not activated, the controller 22 returns to 510 in order to receive further angle measurements α for further updates of the distance measurement D. However, if the power tool has been activated, the controller 22 at 560 resets the raw distance measurement D' before returning to 510 in order to receive angle measurements α for a new distance measurement D.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:

1. An apparatus, comprising:
a tool to be applied to a workpiece;
a measurement device comprising a roller positioned at an offset distance from the tool and in a feed path of the tool, wherein the roller is configured to engage a surface of the workpiece and rotate as the workpiece traverses the feed path, and wherein the measurement device is configured to generate a signal indicative of rotation of the roller as the workpiece traverses the roller; and
a controller configured to:
generate a raw distance measurement of the workpiece based on the signal generated by the measurement device as the workpiece traverses the roller;
detect, based on the signal generated by the measurement device as the workpiece traverses the roller, a feed direction of an end of the workpiece; and
generate a distance measurement that indicates a distance between the end of the workpiece and a location of the workpiece to which the tool is to be applied by, at least:
adding the offset distance to the raw distance measurement in response to determining, based on the detected feed direction that the end of the workpiece traverses the roller after passing by the tool; and
subtracting the offset distance from the raw distance measurement in response to determining, based on the detected feed direction, that the end of the workpiece traverses the roller before reaching the tool.

2. The apparatus of claim 1, wherein the measurement device comprises an incremental, rotary encoder configured to generate the signal to be indicative of a plurality of angle increments of the roller as the workpiece traverses the roller and causes the roller to rotate.

3. The apparatus of claim 1, wherein the measurement device comprises an absolute, rotary encoder configured to generate the signal to be indicative of a plurality of absolute positions of the roller as the workpiece traverses the roller and causes the roller to rotate.

4. The apparatus of claim 1, wherein:
the tool comprises a miter assembly;
the miter assembly comprises a saw, a miter base, and a fence against which the workpiece is positioned; and
the roller is positioned in the fence and engages the workpiece as the workpiece traverses the fence.

5. The apparatus of claim 1, wherein:
the tool comprises a miter assembly;
the miter assembly comprises a saw, a miter base, and a fence against which the workpiece is positioned; and
the roller is positioned in the miter base and engages the workpiece as the workpiece traverses the miter base.

6. The apparatus of claim 1, further comprising a display configured to present one or more digits representative of the distance measurement of the workpiece.

7. The apparatus of claim 1, further comprising a display configured to present a direction of travel of the workpiece in relation to the tool.

8. A miter assembly, comprising:
a miter base having a fence against which a workpiece is placed;
a saw coupled to the miter base;
a measurement device comprising a roller positioned at an offset distance from the saw and in a feed path of the saw, wherein the roller is configured to engage a surface of the workpiece and rotate as the workpiece traverses the feed path, and wherein the measurement device is configured to generate a signal indicative of rotation of the roller as the workpiece traverses the fence toward the saw; and
a controller configured to:
generate a raw distance measurement of the workpiece based on the signal generated by the measurement device as the workpiece traverses the roller;
detect, based on the signal generated by the measurement device as the workpiece traverses the roller, a feed direction of an end of the workpiece; and
generate a distance measurement that indicates a distance between the end of the workpiece and a location of the workpiece to which the saw is to be applied by, at least:
adding the offset distance to the raw distance measurement in response to determining, based on the detected feed direction, that the end of the workpiece traverses the roller after passing by the saw; and
subtracting the offset distance from the raw distance measurement in response to determining, based on the detected feed direction, that the end of the workpiece traverses the roller before reaching the saw.

9. The miter assembly of claim 8, wherein:
the measurement device comprises an incremental, rotary encoder coupled to a shaft of the roller; and
the incremental, rotary encoder is configured to generate the signal of the measurement device to be indicative of a plurality of angle increments of the shaft as the workpiece traverses the roller and causes the roller to rotate the shaft.

10. The miter assembly of claim 8, wherein:
the measurement device comprises an absolute, rotary encoder coupled to a shaft of the roller; and
the absolute, rotary encoder is configured to generate the signal of the measurement device to be indicative of a plurality of absolute positions of the shaft as the workpiece traverses the roller and causes the roller to rotate the shaft.

11. The miter assembly of claim 8, wherein the roller extends through a surface of the fence and engages the workpiece as the workpiece traverses the fence.

12. The miter assembly of claim 8, wherein the roller extends through a surface of the miter base and engages the workpiece as the workpiece traverses the fence.

13. The miter assembly of claim 8, further comprising a display configured to present one or more digits representative of the distance measurement of the workpiece.

14. The miter assembly of claim 8, further comprising a display configured to present a direction of travel of the workpiece in relation to the saw.

15. A method of operating a miter assembly, the method comprising:
receiving a workpiece against a fence of a miter base for the miter assembly;
feeding the workpiece along the fence toward a saw coupled to the miter base;

engaging a surface of the workpiece with a roller of a measurement device that is positioned at an offset distance from the saw and in a feed path of the saw;

rotating the roller of the measurement device as the workpiece traverses the feed path;

generating, with the measurement device, a signal indicative of rotation of the roller as the workpiece traverses the fence toward the saw;

generating, with a controller of the miter assembly, a raw distance measurement of the workpiece based on the signal generated by the measurement device as the workpiece traverses the roller;

detecting, based on the signal generated by the measurement device as the workpiece traverses the roller, a feed direction of an end of the workpiece; and generating, with the controller, a distance measurement that indicates a distance between the end of the workpiece and a location of the workpiece to which the saw is to be applied by, at least:

adding the offset distance to the raw distance measurement in response to determining, based on the detected feed direction, that the end of the workpiece traverses the roller after passing by the saw; and     subtracting the offset distance from the raw distance measurement in response to determining, based on the detected feed direction, that the end of the workpiece traverses the roller before reaching the saw.

16. The method of claim 15, wherein said generating the distance measurement comprises generating, with an incremental, rotary encoder of the measurement device, the signal of the measurement device to be indicative of a plurality of angle increments of the roller as the workpiece traverses the roller and causes the roller to rotate.

17. The method of claim 15, wherein said generating the distance measurement comprises generating, with an absolute, rotary encoder of the measurement device, the signal of the measurement device to be indicative of a plurality of absolute positions of the roller as the workpiece traverses the roller and causes the roller to rotate.

18. The method of claim 15, further comprising displaying, on a display of the miter assembly, one or more digits representative of the distance measurement of the workpiece.

* * * * *